G. E. MILLER & C. M. WHEATON.
TIRE.
APPLICATION FILED APR. 6, 1908.
929,620.
Patented July 27, 1909.
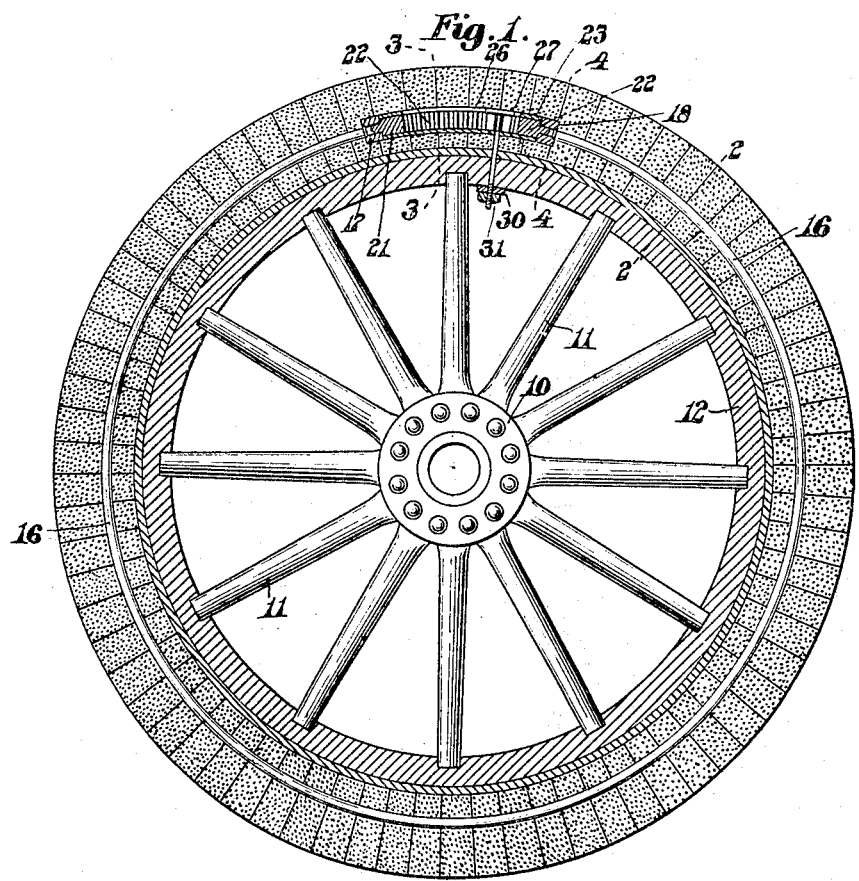
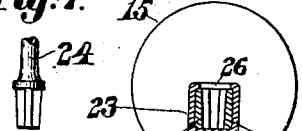
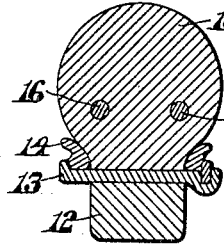
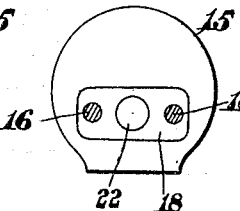
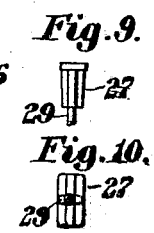
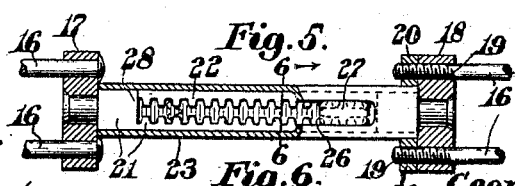
Witnesses:
Nathan C. Lombard
Howard Harrison
Inventors:
George E. Miller,
Carl M. Wheaton,
by Walter E. Lombard,
Atty.

UNITED STATES PATENT OFFICE.

GEORGE E. MILLER, OF NEWTON CENTER, AND CARL M. WHEATON, OF NEWTONVILLE, MASSACHUSETTS; SAID WHEATON ASSIGNOR TO SAID MILLER.

TIRE.

No. 929,620.     Specification of Letters Patent.     Patented July 27, 1909.

Application filed April 6, 1908. Serial No. 425,554.

*To all whom it may concern:*

Be it known that we, GEORGE E. MILLER and CARL M. WHEATON, citizens of the United States of America, and residents of, respectively, Newton Center and Newtonville, both in the county of Middlesex and State of Massachusetts, have invented certain new and useful Improvements in Tires, of which the following is a specification.

This invention relates to vehicle tires and has for its object the production of a wheel which will dispense with the use of rubber or pneumatic tires, while at the same time the same degree of resiliency is obtained.

It consists in certain novel features of construction and arrangement of parts which will be readily understood by reference to the description of the drawings and to the claims hereinafter given.

Of the drawings: Figure 1 represents a section of a wheel with a tire applied thereto embodying the features of this invention. Fig. 2 represents a section through the rim of the wheel and the tire thereon, drawn to an enlarged scale, the cutting plane being on line 2—2 on Fig. 1. Fig. 3 represents a section through the tire itself, the section being on line 3—3 on Fig. 1. Fig. 4 represents a section through the tire itself, the cutting plane being on line 4—4 on Fig. 1. Fig. 5 represents a sectional plan of the devices for securing together the ends of the members for holding the tire upon the rim of the wheel. Fig. 6 represents a section of the same on line 6—6 on Fig. 5 looking in the direction of the arrow. Figs. 7 and 8 represent, respectively, an elevation and an inverted plan of the lower end of the tool for adjusting the securing devices, and Figs. 9 and 10 represent, respectively, an elevation and an inverted plan of the locking member for retaining the securing members in adjusted position.

Similar characters designate like parts throughout the several figures of the drawings.

In the drawings, 10 represents the hub of a wheel provided with a plurality of spokes 11 on the outer end of which is mounted the usual wooden felly 12. On the outer periphery of the felly 12 is a rim 13 of any well-known construction. Retained between the outwardly extending flanges 14 of said rim 13 are a plurality of disks 15 of felt, the fiber of which extends outwardly in the direction of the periphery of said wheel. These disks 15 of felt or other similar yieldable material are held in position by means of one or more yielding members 16 which extend through suitable openings in said disk 15 and have secured to their ends the shouldered members 17 and 18. The members 16 are headed or otherwise secured to the member 17 at one end and at the opposite end, the ends of these members 16 are threaded as at 19 and pass through the member 18 and on the threaded ends are mounted nuts 20 by which the member 18 may be adjusted lengthwise of said members 16. The member 17 has secured thereto a rack 21 while the member 18 has secured thereto a similar rack 22, the teeth of said racks being opposed to one another as indicated in Fig. 5.

The racks 21 and 22 are confined within a sleeve 23 in which they are adapted to be moved longitudinally in opposite directions by means of the tool 24. This tool 24 is provided with three teeth 25 which are adapted to be inserted between the teeth of the racks 21 and 22 as indicated in dotted lines in Fig. 5.

It is obvious that when the tool is so located and turned in either direction it will cause a movement of the racks in opposite directions. The outer side of the sleeve 23 is provided with an opening 26 extending longitudinally thereof through which the tool 24 may be inserted when it is desired to operate the racks 22 thereby.

When the racks 21 and 22 have been adjusted sufficiently and it is desired to lock the same in adjusted position the four-toothed locking device 27 is inserted through the opening 26 so that the teeth of said locking device engage the teeth of the racks 21 and 22 in such a manner that further movement of these racks is prevented. The tool 24 is then removed.

In making up the tire, a plurality of disks 15 are inserted upon the yielding members or split rings 16 and forced against the member 17, these disks extending to the opposite ends of the rings. The shouldered member 18 is then inserted upon the opposite end of the split rings 16 and the nuts 20 are operated to clamp the various felt disks solidly together throughout the entire length of the ring. The racks 21 and 22 are placed within the sleeve 23 while other disks of felt or other yieldable material are placed thereon interposed between the members 17 and 18.

As the racks 21 and 22 may be moved outwardly in opposite directions in the sleeve 23 it is obvious that the ring with the disks thereon may be expanded sufficiently so that it may be placed upon the rim 13 and when positioned thereon the tool 24 is inserted between two of the disks 15 through the slot 26 in the outer face of the sleeve 23 and between the teeth of the racks 21 and 22. The operator then turns the tool 24 until the racks 21 and 22 have been brought into the position shown in Fig. 5 with the ends of one rack abutting the shoulder 28 on the other. When this has been accomplished, the locking device 27 is inserted between two disks 15 which are compressed by any suitable means during this insertion, the shank 29 of said locking device extending through an opening in the rim 13 and felly 12, while its outer end has threaded thereto the nuts 30 and 31 preventing the accidental displacement of the locking device 27 from engaging with the teeth of the racks 21 and 22.

As indicated in Fig. 5, when this locking device 27 has been inserted the short teeth thereof enter the space between two teeth on each of the racks 21 and 22 while the longer blades are interposed between the faces of the teeth of said racks, thus preventing the locking device from turning and the racks from moving longitudinally in either direction.

It is obvious that during the adjustment of the racks 21 and 22 and the insertion of the locking device 27, it is necessary to compress the disks 15 between the members 17 and 18 sufficiently to permit of this operation and that as soon as the locking device 27 has been properly inserted and the tool 24 removed the compression upon the disks 15 is removed so that they may expand sufficiently to make the tires continuous throughout the entire periphery of the wheel.

In the drawing the devices for holding the felt or fibrous disks to the rim of the wheel are indicated as a pair of split rings but it is obvious that any other suitable means may be used equally as well.

It is also evident that the details of construction of the various parts of the device may be varied from the form shown and described without altering the principles of the invention.

This makes a very resilient tire while at the same time it overcomes many of the objections to a pneumatic tire as it is obvious that in a tire such as is shown and described herein there is no possibility of puncture. Its wearing qualities excel those of the rubber tire while it is less liable to skid.

It is believed that the advantages and operation of a tire such as is herein shown will be fully understood without further description.

Having thus described our invention, we claim:

1. In a vehicle tire, the combination of a split ring; members secured to the ends of said ring and projecting beyond the periphery thereof each member overlapping the other; a plurality of disks of yieldable material on said ring throughout its length between said members; means interposed between the overlapping ends of said members for drawing the ends of said ring together; and a locking device engaging said overlapping ends to retain them in adjusted position.

2. In a vehicle tire, the combination of a split ring; a shouldered member secured to each end thereof; a plurality of disks of yieldable material on said ring throughout its length; a rack secured to each member the teeth of which face one another; and an elongated member provided with rack teeth on two opposite faces adapted to engage the teeth of said racks to lock them in adjusted position.

3. In a vehicle tire, the combination of two split rings of equal diameter; a plurality of disks of yieldable material on said rings throughout their length; a bar secured to each end of said pair of rings and connecting them; a rack secured to each bar and provided with rack teeth facing the teeth of the other rack; means for preventing the lateral separation of said racks; and means for preventing said racks moving longitudinally of each other.

4. In a vehicle tire, the combination of two split rings of equal diameter; a plurality of disks of yieldable material on said rings throughout their length; a bar secured to one end of said pair of rings; a second bar movably mounted on the other end of said pair of rings; members mounted on the ends of said rings adapted to adjust said second bar thereon; a rack secured to each bar and provided with rack teeth facing the teeth of the other rack; means for preventing the lateral separation of said racks; and means for preventing said racks moving longitudinally of each other.

Signed by us at 7 Water St., Boston, Mass., this 16th day of March, 1908.

GEORGE E. MILLER.
CARL M. WHEATON.

Witnesses:
WALTER E. LOMBARD,
NATHAN C. LOMBARD.